United States Patent
Lim et al.

(10) Patent No.: US 10,608,251 B2
(45) Date of Patent: Mar. 31, 2020

(54) LITHIUM-NICKEL BASED POSITIVE ELECTRODE ACTIVE MATERIAL, METHOD OF PREPARING THE SAME, AND LITHIUM SECONDARY BATTERY INCLUDING THE SAME

(71) Applicant: LG Chem, Ltd., Seoul (KR)

(72) Inventors: Jin Hyung Lim, Daejeon (KR); Ho Suk Shin, Daejeon (KR); Dong Hun Lee, Daejeon (KR); Hyun Jin Oh, Daejeon (KR); Joo Hong Jin, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 295 days.

(21) Appl. No.: 15/037,003

(22) PCT Filed: Feb. 26, 2015

(86) PCT No.: PCT/KR2015/001882
§ 371 (c)(1),
(2) Date: May 16, 2016

(87) PCT Pub. No.: WO2015/130106
PCT Pub. Date: Sep. 3, 2015

(65) Prior Publication Data
US 2016/0293951 A1 Oct. 6, 2016

(30) Foreign Application Priority Data

Feb. 28, 2014 (KR) ........................ 10-2014-0024221

(51) Int. Cl.
*H01M 4/525* (2010.01)
*H01M 4/505* (2010.01)
(Continued)

(52) U.S. Cl.
CPC ......... *H01M 4/525* (2013.01); *H01M 4/0471* (2013.01); *H01M 4/0497* (2013.01);
(Continued)

(58) Field of Classification Search
CPC ...... H01M 4/505; H01M 4/525; H01M 4/366; H01M 4/5825; H01M 10/052;
(Continued)

(56) References Cited

U.S. PATENT DOCUMENTS 5,679,481 A 10/1997 Takanishi et al.
2002/0076612 A1 6/2002 Tanizaki et al.
(Continued)

FOREIGN PATENT DOCUMENTS

CN 1139299 A 1/1997
CN 1495945 A 5/2004
(Continued)

OTHER PUBLICATIONS

Lithium-Manganese-oxide-based positive electrode active material and preparation method thereof, By Sun Xuelei et al. (CN104681816 (A)—Jun. 3, 2015) machine English language translation.*
(Continued)

*Primary Examiner* — Jonathan G Jelsma
*Assistant Examiner* — Omar M Kekia
(74) *Attorney, Agent, or Firm* — Lerner, David, Littenberg, Krumholz & Mentlik, LLP (57) ABSTRACT

The present disclosure relates to a positive electrode active material which reduces lithium by-products and improves structural stability and includes a lithium-nickel based transition metal composite oxide in which an alkaline earth metal having oxidation number of +2 is doped and a phosphate coated layer formed on the outer surface of the composite oxide. Accordingly, a second battery including the positive electrode active material has excellent capacity
(Continued)

characteristics, and also improves structural stability during charging/discharging and prevents swelling, thereby being capable of exhibiting excellent life characteristics. Therefore, the present invention may be easily applied to industry in need thereof, and particularly to electric vehicles industry requiring high capacity and long-term life characteristics.

2 Claims, 1 Drawing Sheet

(51) Int. Cl.
| | |
|---|---|
| H01M 4/36 | (2006.01) |
| H01M 4/58 | (2010.01) |
| H01M 4/04 | (2006.01) |
| H01M 4/131 | (2010.01) |
| H01M 4/1315 | (2010.01) |
| H01M 4/136 | (2010.01) |
| H01M 4/50 | (2010.01) |
| H01M 4/52 | (2010.01) |
| H01M 10/0525 | (2010.01) |
| H01M 10/052 | (2010.01) |
| H01M 4/02 | (2006.01) |

(52) U.S. Cl.
CPC ........... *H01M 4/131* (2013.01); *H01M 4/136* (2013.01); *H01M 4/1315* (2013.01); *H01M 4/366* (2013.01); *H01M 4/502* (2013.01); *H01M 4/505* (2013.01); *H01M 4/523* (2013.01); *H01M 4/5825* (2013.01); *H01M 10/0525* (2013.01); *H01M 10/052* (2013.01); H01M 2004/028 (2013.01); Y02E 60/122 (2013.01); Y02P 70/54 (2015.11)

(58) Field of Classification Search
CPC .... H01M 4/136; H01M 4/1315; H01M 4/131; H01M 4/0497; H01M 2004/028; H01M 10/0525; H01M 4/523; H01M 4/502; H01M 4/0471; Y02P 70/54; Y02E 60/122
USPC ........................................................ 429/221
See application file for complete search history.

(56) References Cited

U.S. PATENT DOCUMENTS

| | | | |
|---|---|---|---|
| 2003/0082448 A1 | 5/2003 | Cho et al. | |
| 2004/0096743 A1 | 5/2004 | Okae et al. | |
| 2005/0118511 A1 | 6/2005 | Park et al. | |
| 2008/0206650 A1 | 8/2008 | Kim et al. | |
| 2009/0087731 A1* | 4/2009 | Fukui .................. | H01M 4/131 429/164 |
| 2009/0104530 A1* | 4/2009 | Shizuka ............... | H01M 4/505 429/223 |
| 2011/0059367 A1 | 3/2011 | Morita et al. | |
| 2011/0081578 A1* | 4/2011 | Chang .................. | H01M 4/366 429/223 |
| 2012/0135305 A1 | 5/2012 | Kim et al. | |
| 2012/0141873 A1* | 6/2012 | Kim ..................... | H01M 4/131 429/220 |
| 2012/0248388 A1* | 10/2012 | Nagai ................... | H01M 4/505 252/519.15 |
| 2013/0183578 A1* | 7/2013 | Oya ...................... | H01M 4/505 429/200 |
| 2014/0234718 A1 | 8/2014 | Lee et al. | |

FOREIGN PATENT DOCUMENTS

| | | | | |
|---|---|---|---|---|
| CN | 104681816 A | * | 6/2015 | ........ H01M 10/0525 |
| EP | 0712172 A2 | | 5/1996 | |
| JP | H0917430 A | | 1/1997 | |
| JP | H11162510 A | | 6/1999 | |
| JP | 2003007299 A | | 1/2003 | |
| JP | 2005166656 A | | 6/2005 | |
| JP | 2006261127 A | | 9/2006 | |
| JP | 2008210767 A | | 9/2008 | |
| JP | 2009266712 A | | 11/2009 | |
| JP | 2011082133 A | | 4/2011 | |
| JP | 2011233369 A | | 11/2011 | |
| JP | 2013087040 A | | 5/2013 | |
| JP | 2013254721 A | | 12/2013 | |
| JP | 2014022293 A | | 2/2014 | |
| JP | 2015503181 A | | 1/2015 | |
| KR | 20020017967 A | | 3/2002 | |
| KR | 20120028622 A | | 3/2012 | |
| KR | 20120056674 A | | 6/2012 | |
| KR | 20120061374 A | | 6/2012 | |
| KR | 20130084361 A | | 7/2013 | |
| WO | 2013109038 A1 | | 7/2013 | |

OTHER PUBLICATIONS

International Search Report from PCT/KR2015/001882, dated May 22, 2015.
D'Epifanio et al., Effect of Mg2+ Doping on the Structural, Thermal, and Electrochemical Properties of LiNi 0.8 Co 0.16 Mg 0.04 0 2, Chemistry of MAterials, vol. 16, No. 18, pp. 3559-3564, Sep. 2004.
Supplemental European Search Report for EP Application 15755793.5 dated Feb. 2, 2017.
Third Party Observations for Application No. JP2016564935 dated Mar. 17, 2017.
Search Report for Chinese Office Action for Application 201580006499.X dated Feb. 24, 2018.

* cited by examiner

LITHIUM-NICKEL BASED POSITIVE ELECTRODE ACTIVE MATERIAL, METHOD OF PREPARING THE SAME, AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2015/001882 filed Feb. 26, 2015, published in Korean, which claims priority to Korean Patent Application No. 10-2014-0024221, filed on Feb. 28, 2014, the disclosures of which are incorporated herein by reference.

TECHNICAL FIELD

The present disclosure relates to a positive electrode active material which reduces lithium by-products and improves structural stability and includes a lithium-nickel based transition metal composite oxide in which an alkaline earth metal having oxidation number of +2 is doped, and a phosphate coated layer formed on the surface of the composite oxide, a positive electrode including the positive electrode active material, and a secondary battery including the positive electrode.

BACKGROUND ART

Technological developments and increased demands for mobile devices have led to a rapid increase in demands for secondary batteries as energy sources. Among various secondary batteries, lithium secondary batteries having high energy density, high voltage, long cycle life, and low self-discharge rate are commercially available and widely used.

Moreover, as interest in environmental issues increases, there is growing interest in electric vehicles and hybrid electric vehicles being capable of replacing fossil fuel powered vehicles, such as gasoline vehicles and diesel vehicles, which use fossil fuel that is one of the main causes of air pollution. Accordingly, researches for using lithium secondary batteries as power sources of electric vehicles, hybrid electric vehicles, and the like are being actively conducted.

In order to use lithium secondary batteries for electric vehicles, the lithium secondary batteries should have high energy density and characteristics of generating high power in a short time, and also withstand over 10 years under severe conditions. Therefore, significantly better stability than typical compact lithium secondary batteries and long-term life characteristics are necessarily required.

A lithium secondary battery refers to a battery which includes an electrode assembly and a non-aqueous electrolyte containing lithium ions, wherein the electrode assembly includes a positive electrode including a positive electrode active material enabling intercalation and deintercalation of lithium ions, a negative electrode including a negative electrode active material enabling intercalation and deintercalation of lithium ions, and a microporous separator disposed between the positive electrode and the negative electrode.

Examples of positive electrode active materials of lithium secondary batteries include transition metal oxides such as a lithium cobalt oxide ($LiCoO_2$), a lithium manganese oxide ($LiMn_2O_4$), or a lithium nickel oxide ($LiNiO_2$), and composite oxides in which transition metals contained in each aforesaid material are partially substituted with other transition metals.

Among the positive electrode active materials, $LiCoO_2$ is being widely used due to its excellent overall properties such as cycle characteristics. However, $LiCoO_2$ has low stability and is costly due to resource limitations of cobalt as a raw material, thus disadvantageously having limited mass-utilization as power sources in the fields of electric vehicles or the like.

Lithium manganese oxides such as $LiMnO_2$ and $LiMn_2O_4$ advantageously are abundant resources and use environmentally friendly manganese, thus attracting much attention as a positive electrode active material as an alternative to $LiCoO_2$. However, these lithium manganese oxides have disadvantages such as low capacity and poor cycle characteristics.

On the other hand, lithium nickel oxides such as $LiNiO_2$ are not only cheaper than the cobalt oxides, but also higher in discharge capacity, when charged at 4.3V, wherein the reversible capacity of doped $LiNiO_2$ approximates to about 200 mAh/g which is higher than the capacity of $LiCoO_2$ (about 165 mAh/g).

Accordingly, despite slightly low average discharge voltage and volumetric density, commercial batteries including $LiNiO_2$ as a positive electrode active material exhibit improved energy density, and a great deal of research for developing high-capacity batteries using these nickel-based positive electrode active materials is thus being actively conducted. However, despite the advantage of high capacity, lithium nickel oxides have a limitation in practical use because lithium nickel oxides encounter several problems such as a rapid phase transition in a crystal structure caused by volumetric changes accompanying charge/discharge cycles, resultant particle fracture or pores at grain boundaries, generation of a large amount of gas during storage or cycles, and sharp decrease in surface chemical resistance when exposed to air and moisture.

Accordingly, lithium transition metal oxides, in which nickel in the oxides is partially substituted with other transition metals such as manganese and cobalt, have been suggested. Such metal substituted nickel based lithium transition metal oxides advantageously have relatively excellent cycle characteristics and capacity characteristics; however, when used for a long time, cycle characteristics are drastically deteriorated, and problems such as swelling caused by gas generation in a battery and low chemical stability have not been sufficiently solved. Therefore, it is necessary to develop improved techniques to solve problems of high temperature stability while using a lithium nickel based positive electrode active material suitable for a high-capacity battery.

Moreover, lithium nickel based positive electrode active materials basically generate a large amount of lithium by-products ($Li_2CO_3$ and $LiOH$) on the surface thereof. These lithium by-products form a resistive film, and react with a solvent (for example, PVDF) to cause gelation of slurry during the preparation of positive electrode active material slurry, and also generate gas in a battery to cause swelling, thereby significantly reducing life characteristics of the battery.

Therefore, various attempts have been made to solve aforementioned problems through surface stabilization using surface treatment, doping or the like or improvement of structural stability, but efficient methods have not yet been developed.

Based on the above-described background, while conducting research on a method for improving life characteristics of a battery by improving structural stability and by reducing lithium by-products and thus preventing swelling and resistive film formation caused by the by-products, the present inventors found that lithium by-products were significantly reduced on the surface of a positive electrode active material, and life characteristics of a battery including the positive electrode active material significantly increased, wherein the positive electrode active material is prepared in such a way that an alkaline earth metal having oxidation number of +2 was doped into a lithium-nickel based transition metal composite oxide and a phosphate coated layer was formed on the surface of the composite oxide; and finally completed the present invention.

DISCLOSURE OF THE INVENTION

Technical Problem

An object of the present disclosure is to provide a positive electrode active material which reduces lithium by-products and improves structural stability and includes a lithium-nickel based transition metal composite oxide and a phosphate coated layer formed on the surface of the composite oxide.

Another object of the present disclosure is to provide a method of preparing the positive electrode active material.

Still another object of the present disclosure is to provide a positive electrode for a secondary battery, in which a current collector is coated with positive electrode active material slurry containing the positive electrode active material.

Furthermore, even another object of the present disclosure is to provide a secondary battery having excellent life characteristics, the secondary battery including the positive electrode for a secondary battery, a negative electrode, a separator disposed between the positive electrode and the negative electrode, and an electrolyte.

Technical Solution

To solve the above-described problems, an aspect of the present disclosure provides a positive electrode active material including: a lithium-nickel based transition metal composite oxide having a layered structure, which is expressed by Chemical Formula 1 below; and a phosphate coated layer formed on the surface of the composite oxide.

[Chemical Formula 1]

where, $1.0 \leq x \leq 1.2$, $0.5 \leq a \leq 1$, $0 < b \leq 0.5$, $0 \leq y < 0.2$, $0 < w \leq 0.3$, and $2 \leq x+a+b+w \leq 2.2$;

M is at least one selected from the group consisting of Mn, Co, Cr, Fe, V, and Zr;

A is at least one alkaline earth metal having oxidation number of +2; and

D is at least one selected from the group consisting of S, N, F, Cl, Br, I, and P.

Another aspect of the present disclosure provides a method of preparing a positive electrode active material, the method including: mixing an alkaline earth metal precursor having oxidation number of +2 into a mixed solution of a transition metal precursor and a lithium precursor, and then sintering the resultant solution to prepare the lithium-nickel based transition metal composite oxide expressed by Chemical Formula 1 above (step 1); and mixing a phosphate precursor into the composite oxide, and then sintering the resultant mixture to form a phosphate coated layer on the outer surface of the composite oxide (step 2).

Still another aspect of the present disclosure provides a positive electrode for a secondary battery, in which a current collector is coated with positive electrode active material slurry containing the positive electrode active material.

Furthermore, even another aspect of the present disclosure provides a lithium secondary battery including the positive electrode for a secondary battery, a negative electrode, a separator disposed between the positive electrode and the negative electrode, and an electrolyte.

Advantageous Effects

The positive electrode active material according to the present disclosure includes a lithium-nickel based transition metal composite oxide in which an alkaline earth metal having oxidation number of +2 is doped and a phosphate coated layer formed on the outer surface of the composite oxide. Accordingly, the alkaline earth metal (cations thereof) having oxidation number of +2 is located at lithium sites (lithium cation sites) in the composite oxide or some vacant sites in crystal lattices and thus acts as a kind of pillar in the crystal lattices, thereby being capable of improving structural stability of the positive electrode active material and reducing a natural loss of lithium cations and thus reducing the formation of lithium by-products (LiOH and $Li_2CO_3$) caused by the natural loss of lithium cations. At the same time, the phosphate coated layer surrounding the outer surface of the composite oxide reacts with lithium by-products present on the outer surface to reduce the lithium by-products, thereby being capable of significantly reducing lithium by-products and thus preventing swelling and resistive film formation caused by the lithium by-products.

Therefore, the second battery including the positive electrode active material according to the present disclosure has excellent capacity characteristics, and also improves structural stability during charging/discharging and prevents swelling, thereby being capable of exhibiting excellent life characteristics. Therefore, the secondary battery may be easily applied to industry in need thereof, and particularly to electric vehicles industry requiring high capacity and long-term life characteristics.

BRIEF DESCRIPTION OF THE DRAWINGS

The accompanying drawing herein illustrates exemplary embodiments of the present disclosure and, together with the description, serves to provide a further understanding of the inventive concept, and thus the present disclosure should not be construed as being limited to only the drawings.

MODE FOR CARRYING OUT THE INVENTION

Hereinafter, the present invention will be described in more detail to facilitate understanding of the present disclosure.

Terms or words used in this specification and claims should not be restrictively interpreted as ordinary or dictionary-based meanings, but should be interpreted as meanings and concepts conforming to the inventive concept on the basis of the principle that an inventor can properly define the concept of terms to explain his or her own invention in the best ways.

The present disclosure provides a positive electrode active material having reduced lithium by-products and improved structural stability, by doping an alkaline earth metal having oxidation number of +2 into a lithium-nickel based transition metal composite oxide and then forming a phosphate coated layer on the outer surface of the composite oxide.

The positive electrode active material according to an embodiment of the present disclosure includes a lithium-nickel based transition metal composite oxide having a layered structure, which is expressed by Chemical Formula 1 below; and a phosphate coated layer formed on the surface of the composite oxide.

$$Li_xNi_aM_bA_wO_{2-y}D_y \qquad \text{[Chemical Formula 1]}$$

where, $1.0 \leq x \leq 1.2$, $0.5 \leq a \leq 1$, $0 < b \leq 0.5$, $0 \leq y < 0.2$, $0 < w \leq 0.3$, and $2 \leq x+a+b+w \leq 2.2$; M is at least one selected from the group consisting of Mn, Co, Cr, Fe, V, and Zr; A is at least one alkaline earth metal having oxidation number of +2; and D is at least one selected from the group consisting of S, N, F, Cl, Br, I, and P.

The positive electrode active material is based on a lithium-nickel oxide ($LiNiO_2$). Adding an element indicated by M in Chemical Formula 1 above may supplement the structural instability of the positive electrode active material, and doping an element indicated by A may supplement the structural instability of the positive electrode active material and also prevent a natural loss of lithium cations, thereby reducing lithium by-products caused by the natural loss of lithium cations. In this case, electrochemical properties may be significantly varied depending on a molar ratio of nickel (Ni) and elements indicated by M and A. Therefore, it may be important to properly adjust the molar ratio of nickel (Ni) and elements indicated by M and A.

Specifically, the content of nickel (Ni) in the positive electrode active material may be 70 mol % or more, and preferably 75 mol % or more, based on the total amount of metallic components excluding lithium, i.e., based on the total amount of elements indicated by Ni, M, and A in Chemical Formula 1 above.

Furthermore, the element indicated by M may be at least one of the aforesaid elements, and preferably the M may be $Mn_{b1}Co_{b2}$, where, $0 < b1+b2 \leq 0.5$, and preferably $0 < b1+b2 \leq 0.3$.

If the content of nickel in the positive electrode active material is 70 mol % or more and the element indicated by M satisfies the above condition, then a secondary battery including the positive electrode active material may have excellent battery characteristics such as discharge voltage and capacity characteristics.

The element indicated by A is doped into lithium sites (lithium cation sites) in order to prevent incorporation of nickel cations into a lithium layer in the positive electrode active material. The A is an alkaline earth metal having oxidation number of +2, and has a characteristic that the ionic radius thereof is larger than a nickel cation.

Specifically, the alkaline earth metal having oxidation number of +2, which is indicated by A, may be located at lithium sites (lithium cation sites) in the crystal structure of the positive electrode active material or vacant sites in crystal lattices. Accordingly, charge balance may be established and cation mixing, i.e., incorporation of nickel cations into lithium cation sites may thus be prevented, and the alkaline earth metal also acts as a kind of pillar in the crystal lattices, thereby being capable of improving structural stability of the positive electrode active material and reducing the natural loss of lithium cations. As a result, the alkaline earth metal may improve structural stability during charging/discharging of a secondary battery including the positive electrode active material, also prevent formation of by-products (LiOH and $Li_2CO_3$) caused by the natural loss of lithium cations, and thus reduce swelling caused by the by-products, thereby serving to improve life characteristics of the battery.

The alkaline earth metal having oxidation number of +2, which is indicated by A in Chemical Formula 1 above, may be preferably Sr.

Furthermore, D in Chemical Formula 1 above is an anion having oxidation number of −1 or −2, and the oxygen ion in Chemical Formula 1 above may be substituted with the anion in a predetermined range.

As described above, the anion may be at least one selected from the group consisting of S, N, F, Cl, Br, I, and P. Such anion substitution may increase bonding strength of transition metals, prevent structural transition in a positive electrode active material, and thus lead to improve life characteristics of a battery. However, when the amount of the substituted anion is too large ($y \geq 0.2$), life characteristics of a battery may rather be degraded due to formation of unstable crystal structure.

As described above, the positive electrode active material includes a phosphate coated layer formed on the outer surface of the lithium-nickel based transition metal composite oxide expressed by Chemical Formula 1 above. Furthermore, the phosphate coated layer may have a thickness of a few nanometers to tens of nanometers or more, and specifically the thickness may be 1 to 100 nm.

The phosphate coated layer reacts with lithium by-products present in the outer surface of the composite oxide, i.e., LiOH and $Li_2CO_3$, to form $Li_3PO_4$, and thus reduces the lithium by-products, thereby being capable of preventing swelling and resistive film formation caused by the by-products, and reacts with the lithium-nickel based transition metal composite oxide expressed by Chemical Formula 1 above to form reaction products including a structure expressed by Chemical Formula 2 below in a transition metal layer, thereby being capable of improving structural stability of the positive electrode active material. Therefore, a secondary battery including the positive electrode active material may have improved storage characteristics and life characteristics.

$$Li(Li_{3e+f}M'_{1-f}P_e)O_{2+z} \qquad \text{[Chemical Formula 2]}$$

where, $0 < e < 0.1$, $0 < f < 0.3$, and $-4e < z \leq 4e$; and when 3e-f, 3e>f; and M' is $Ni_aM_bA_w$, where M, A, a, b and w are the same as mentioned above.

A phosphate precursor as a raw material of the phosphate may be at least one selected from the group consisting of $(NH_4)_2HPO_4$, $(NH_4)_2H_2PO_4$, $(NH_4)_3PO_4\cdot3H_2O$, $H_3PO_4$, and $P_2O_5$, and may be preferably $(NH_4)_2HPO_4$.

Another aspect of the present disclosure provides a method of preparing the positive electrode active material having reduced lithium by-products and improved structural stability.

The method of preparing the positive electrode active material according to an embodiment of the present disclosure includes: mixing an alkaline earth metal precursor having oxidation number of +2 into a mixed solution of a transition metal precursor and a lithium precursor, and then sintering the resultant solution to prepare the lithium-nickel based transition metal composite oxide expressed by Chemical Formula 1 above (step 1); and adding a phosphate precursor into the lithium-nickel based transition metal composite oxide, and then sintering the resultant mixture to form a phosphate coated layer on the outer surface of the composite oxide (step 2).

Step 1 is a step for preparing a lithium-nickel based transition metal composite oxide in which the alkaline earth metal expressed by Chemical Formula 1 above is doped, although not particularly limited, the composite oxide may be prepared by methods generally known in the art, and may be prepared by, for example, a solid phase reaction method, a coprecipitation method, a sol-gel method, or a hydrothermal synthesis method.

Specifically, the lithium-nickel based transition metal composite oxide may be prepared in such a way that a nickel precursor forming the nickel based transition metal composite oxide and a transition metal (excluding nickel) precursor are respectively dissolved in a solvent, and thereafter coprecipitated to prepare a transition metal composite hydroxide. A lithium precursor is added to the transition metal composite hydroxide to prepare a mixed solution, and thereafter an alkaline earth metal precursor having oxidation number of +2 is mixed and sintered.

The transition metal composite hydroxide may be a compound expressed by $Me(OH_{1-x})_2$ ($0 \leq x \leq 0.5$), where Me refers to a transition metal which is expressed by $Ni_aM_b$ in Chemical Formula 1 above.

Furthermore, as described above, the nickel precursor, the transition metal (excluding nickel) precursor, and the alkaline earth metal precursor having oxidation number of +2 may be preferably used as being adjusted such that the content of nickel is 70 mol % or more based on the total amount of metallic components excluding lithium.

The sintering in step 1 may be, but is not limited to, heat treatment for 20 to 30 hours at 700 to 900° C.

The transition metal precursor and the lithium precursor may be, but is not particularly limited to, in the form of salts of each metal, such as nitrate, sulfate, carbonate, hydroxide, acetate, oxalate, and chloride.

Furthermore, the alkaline earth metal precursor having oxidation number of +2 may be an alkaline earth metal salt, and specifically may be $SrCO_3$.

Step 2 is a step for preparing a positive electrode active material having reduced lithium by-products and improved structural stability, by forming a phosphate coated layer on the outer surface of the lithium-nickel based transition metal composite oxide prepared in step 1, in which an alkaline earth metal is doped, and may be performed by adding a phosphate precursor into the lithium-nickel based transition metal composite oxide and then sintering the phosphate precursor added lithium-nickel based transition metal composite oxide.

The sintering in step 2 may be heat treatment for 10 hours or less at 100 to 700° C., and specifically the heat treatment may be performed for a time in the range of 1 minute to 10 hours.

The phosphate precursor may be the same as aforementioned precursors, or may be included therein.

Still another aspect of the present disclosure provides a positive electrode for a secondary battery, in which a current collector is coated with positive electrode slurry containing the positive electrode active material.

The positive electrode according to an embodiment of the present disclosure may be prepared by coating positive electrode active material slurry containing the positive electrode active material onto a positive electrode current collector, and then drying and rolling the slurry coated current collector.

The positive electrode current collector generally may be used with a thickness of 3 to 500 µm. Although not particularly limited, any material which has a high conductivity without causing any chemical change in the battery, for example, stainless steel, aluminum, nickel, titanium, baked carbon, or aluminum or stainless steel which is surface-treated with carbon, nickel, titanium, silver, or the like may be used as the positive electrode current collector.

The positive electrode active material slurry may be prepared by adding and mixing additives such as a binder, a conducting agent, a filler, and a dispersant into the positive electrode active material.

The binder is a component for aiding a bond between the positive electrode active material and the conducting agent and a bond for the current collector, and generally may be added up to 1 to 30 wt % based on the total amount of the positive electrode active material. Although not particularly limited, a typical binder known in the art may be used as the binder. For example, the binder may be one or a mixture of two or more selected from the group consisting of vinylidenefluoride-hexafluoropropylene copolymer (PVDF-co-HFP), polyvinylidenefluoride, polyacrylonitrile, polymethylmethacrylate, polyvinylalcohol, carboxymethylcellulose (CMC), starch, hydroxypropylcellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene-butylene rubber (SBR), and fluororubber.

The conducting agent generally may be added up to 0.05 to 5 wt % based on the total amount of the positive electrode active material. Although not particularly limited, any material which has conductivity without causing side reactions with other elements in the battery may be used as the conducting agent. For example, graphite such as natural graphite or artificial graphite; carbon black such as carbon black (super-p), acetylene black, ketjenblack, channel black, furnace black, lamp black, or thermo-black; conductive fibers such as carbon fibers or metal fibers; metal powder such as fluorocarbon, aluminum, and nickel powder; conductive whisker such as zinc oxide or potassium titanate; conductive metal oxide such as titanium oxide; conductive materials such as polyphenylene derivatives may be used as the conducting agent.

The filler is a component for preventing swelling of the positive electrode, and whether or not to use the filler may be determined as needed. Although not particularly limited, any fibrous material which does not cause any chemical change in the battery, for example, olefin polymer such as polyethylene or polypropylene, and fibrous materials such as glass fibers or carbon fibers may be used as the filler.

The dispersant (dispersion solution) may be, for example, but is not particularly limited to, isopropyl alcohol, N-methylpyrrolidone (NMP), or acetone.

The coating may be performed by a method generally known in the art. For example, the coating may be performed in such a way that the positive electrode active material slurry is distributed on the top surface of one side of the positive electrode current collector, and then uniformly dispersed using doctor blade or the like. In addition, the coating may be performed by various methods such as die casting, comma coating, and screen printing.

Although not particularly limited, the drying may be performed for a day or less in a vacuum oven at 50 to 200° C.

Furthermore, even another aspect of the present disclosure provides a lithium secondary battery including the positive electrode for a secondary battery, a negative electrode, a separator disposed between the positive electrode and the negative electrode, and an electrolyte.

The lithium secondary battery according to an embodiment of the present disclosure includes a positive electrode, a negative electrode, a separator disposed between the positive electrode and the negative electrode, and an electrolyte, the positive electrode including a positive electrode active material having reduced lithium by-products and improved structural stability by doping an alkaline earth metal having oxidation number of +2 into a lithium-nickel based transition metal composite oxide and forming a phosphate coated layer on the surface of the composite oxide.

Furthermore, the lithium secondary battery has a capacity retention ratio of 90% or more compared to the initial capacity, after 55 cycles under 1.00 charge and 1.00 discharge condition at 45° C.

Although not particularly limited, the negative electrode may be prepared by coating negative electrode active material slurry containing a negative electrode active material onto the top surface of one side of a negative electrode current collector and then drying the slurry coated current collector. The negative electrode active material slurry may include additives such as a binder, a conducting agent, a filler, and a dispersant, in addition to the negative electrode active material.

The negative electrode current collector may be the same as the aforementioned positive electrode current collectors, or may be included therein.

Examples of the negative electrode active material may include, but are not particularly limited to, carbon materials, lithium metal, silicon, or tin which are generally known in the art, in which lithium ions are able to be intercalated and deintercalated. Preferably, carbon materials may be used, and low crystalline carbon, highly crystalline carbon, and the like may be all used as the carbon material. Representative examples of the low crystalline carbon include soft carbon and hard carbon, and representative examples of the highly crystalline carbon include natural carbon, Kish graphite, pyrolytic carbon, mesophase pitch based carbon fibers, meso-carbon microbeads, mesophase pitches, and high temperature baked carbon such as petroleum or coal tar pitch derived coke.

The additives such as a binder, a conducting agent, a filler, and a dispersant, which are used for the negative electrode, may be the same as the aforementioned additives used for preparation of the positive electrode, or may be included therein.

The separator may be an insulating thin film having high ionic permeability and mechanical strength, and generally may have a pore diameter of 0.01 to 10 µm and a thickness of 5 to 300 µm. Although not limited, a porous polymer film, for example, made from polyolefin-based polymers such as an ethylene homopolymer, a propylene homopolymer, an ethylene/butene copolymer, an ethylene/hexene copolymer, and an ethylene/methacrylate copolymer may be used alone or in a laminated form as the separator. Alternatively, general porous non-woven fabrics such as non-woven fabrics made from glass fibers having a high melting point, polyethyleneterephthalate fibers, or the like.

Furthermore, the electrolyte may include, but is not limited to, an organic solvent and a lithium salt which are generally used in an electrolyte.

An anion of the lithium salt may be, for example, at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3^-$, $SO_3^-$, $(CF_3SO_2)_2N^-$, $(FSO_2)_2N^-$, $CF_3CF_2^-(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Representative examples of the organic solvent may include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran.

Particularly, among the carbonate based organic solvents, ethylene carbonate and propylene carbonate which are cyclic carbonate may be preferably used because they have high permittivity as a highly viscous organic solvent and thus the lithium salt in the electrolyte easily dissociates thereby. If linear carbonate having low viscosity and low permittivity, such as dimethyl carbonate and diethyl carbonate, are mixed into the cyclic carbonate at a proper ratio, then an electrolytic solution having a high electric conductivity may be produced and thus may be more preferably used.

Furthermore, the electrolyte may, if necessary, further include pyridine, triethylphosphite, triethanolamine, cyclic ether, ethylene diamine, n-glyme, hexaphosphate triamide, nitrobenzene derivatives, sulfur, quinoneimine dye, N-substituted oxazolidinone, N,N-substituted imidazolidine, ethylene glycol dialkyl ether, ammonium salts, pyrrole, 2-methoxy ethanol, aluminum trichloride, or the like in order to improve charge/discharge characteristics and fire retardant properties. In some cases, a halogen-containing solvent such as carbon tetrachloride, trifluoro ethylene may be further included to impart nonflammability, carbon dioxide gas may be further included to improve high temperature storage characteristics, and fluoro-ethylene carbonate (FEC), propene sultone (PRS), and fluoro propylene carbonate (FPC) may be further included.

The lithium secondary battery of the present disclosure may be manufactured in such a way that a separator is disposed between a positive electrode and a negative electrode to form an electrode assembly, the electrode assembly is put into a cylindrical battery case or a prismatic battery case, and then an electrolyte is injected into the cell. Alternatively, the lithium secondary battery may also be manufactured in such a way that the electrode assembly is stacked, thereafter the stacked assembly is impregnated into an electrolyte and the resultant assembly is put into a battery case, and then the battery case is sealed.

A battery case generally used in the art may be selected for the battery case used in the present disclosure. The shape of the battery case according to the use of a battery may be, but is not limited to, a cylinder shape using a can, a square shape, a pouch shape, or a coin shape.

The lithium secondary battery according to the present disclosure may not only be used for a battery cell which is used as a power supply of a small-sized device but also preferably be used as a single cell for a middle/large sized battery module including a plurality of battery cells. Preferred examples of the middle/large device may include, but are not limited to, electric vehicles, hybrid electric vehicles, plug-in hybrid electric vehicles, and electric power storage systems.

Hereinafter, the present disclosure will be described in detail with reference to Examples in order to concretely describe the present disclosure. The invention may, however, be embodied in many different forms and should not be construed as being limited to the embodiments set forth herein; rather, these embodiments are provided to more completely describe the concept of the invention to those of ordinary skill in the art.

Example 1

$Ni_{0.78}Mn_{0.11}Co_{0.11}OOH$ was prepared as a transition metal precursor, and LiOH was mixed into the transition metal precursor at a molar ratio of Li/transition metal=1 to prepare a mixture. 0.2 wt % of $SrCO_3$, based on the weight of the mixture, was added into the mixture and mixed, and then sintered for 24 hours at 800° C. to prepare Sr-doped lithium-nickel based transition metal composite oxide powder. 0.5 wt % of $(NH_4)_2HPO_4$ powder, based on the weight of the composite oxide, was mixed with the composite oxide powder, and the resultant mixture was heat-treated at 500° C. and then sieved (No. 400) to obtain positive electrode active material powder.

Example 2

Positive electrode active material powder was prepared using the same method as in Example 1 except that 1.0 wt % of $(NH_4)_2HPO_4$ powder was used.

Comparative Example 1

$Ni_{0.78}Mn_{0.11}CO_{0.11}OOH$ was prepared as a transition metal precursor, and LiOH was mixed into the transition metal precursor at a molar ratio of Li/transition metal=1, and then the resultant mixture was sintered for 24 hours at 800° C. to prepare positive electrode active material powder.

Comparative Example 2

$Ni_{0.78}Mn_{0.11}Co_{0.11}OOH$ was prepared as a transition metal precursor, and LiOH was mixed into the transition metal precursor at a molar ratio of Li/transition metal=1 to prepare a mixture. 0.2 wt % of $SrCO_3$, based on the weight of the mixture, was added into the mixture and mixed, and then sintered for 24 hours at 800° C. to prepare positive electrode active material powder.

Comparative Example 3

$Ni_{0.78}Mn_{0.11}Co_{0.11}OOH$ was prepared as a transition metal precursor, and LiOH was mixed into the transition metal precursor at a molar ratio of Li/transition metal=1, and then the resultant mixture was sintered for 24 hours at 800° C. to prepare lithium-nickel based transition metal composite oxide powder. 0.5 wt % of $(NH_4)_2HPO_4$ powder, based on the weight of the composite oxide, was mixed with the composite oxide powder, and the resultant mixture was heat-treated at 500° C. and then sieved (No. 400) to obtain positive electrode active material powder.

Example 1-1

The positive electrode active material powder prepared in Example 1 was mixed into NMP so that the weight ratio of positive electrode active material powder conducting agent: binder is 95:2.5:2.5, to prepare positive electrode active material slurry. The positive electrode active material slurry was coated with a thickness of 200 μm onto an aluminum foil having a thickness of 20 μm, and then the coated aluminum foil was subjected to roll pressing and drying to prepare a positive electrode.

The positive electrode was blanked into a coin shape, and a coin-shaped cell was manufactured using the positive electrode, a Li metal as a negative electrode, and a carbonate electrolytic solution in which 1 mole of $LiPF_6$ was dissolved as an electrolyte.

Example 2-1

A cell was manufactured using the same method as in Example 1-1 except that the positive electrode active material powder prepared in Example 2 was used instead of the positive electrode active material powder prepared in Example 1.

Comparative Example 1-1

A cell was manufactured using the same method as in Example 1-1 except that the positive electrode active material powder prepared in Comparative Example 1 was used instead of the positive electrode active material powder prepared in Example 1.

Comparative Example 2-1

A cell was manufactured using the same method as in Example 1-1 except that the positive electrode active material powder prepared in Comparative Example 2 was used instead of the positive electrode active material powder prepared in Example 1.

Comparative Example 3-1

A cell was manufactured using the same method as in Example 1-1 except that the positive electrode active material powder prepared in Comparative Example 3 was used instead of the positive electrode active material powder prepared in Example 1.

Experimental Example 1

In order to comparatively analyze the amount of unreacted residual lithium by-products ($Li_2CO_3$ and LiOH) on the surface of each positive electrode active material powder prepared in Examples 1 and 2 and Comparative Examples 1 to 3, the amount of lithium by-products present on the surface of each positive electrode active material powder was measured using a pH titration method.

Prior to the pH titration, 5 g of each positive electrode active material powder in Examples 1 and 2 and Comparative Examples 1 to 3 was added into 25 ml of water and stirred, and then decanted to separately collect about 20 ml of a transparent solution from the powder. 25 ml of water was again added to the powder and decanted with stirring to collect a transparent solution. By repetitively performing soaking and decanting in this way, 100 ml of a transparent solution containing a water soluble base was collected, and then 0.1 M HCl solution was added dropwise into the transparent solution with stirring to perform pH titration. The titration experiment was terminated when the pH value reached 3 or less, and flow rate was properly adjusted in such a range that titration took about 20 to 30 minutes. The content of the water soluble base was determined by the amount of the acid used until pH reached a value less than 5, and the content of basic impurities on the surface of the powder was calculated therefrom. The results are shown in Table 1 below.

TABLE 1

| Item | Example 1 | Example 2 | Comparative Example 1 | Comparative Example 2 | Comparative Example 3 |
|---|---|---|---|---|---|
| $Li_2CO_3$ (wt %) | 0.110 | 0.071 | 0.118 | 0.170 | 0.101 |
| LiOH (wt %) | 0.166 | 0.151 | 0.305 | 0.211 | 0.210 |
| Total lithium by-products (wt %) | 0.276 | 0.222 | 0.423 | 0.381 | 0.311 |

As shown in Table 1, it was found that both $Li_2CO_3$ and LiOH by-products were significantly reduced in the positive electrode active materials in Examples 1 and 2, in which an alkaline earth metal having oxidation number of +2 was doped and a phosphate coated layer was included according to the present disclosure, compared with the positive electrode active materials in Comparative Examples 1 to 3.

Specifically, it was found that the amount of $Li_2CO_3$ and LiOH by-products was significantly reduced in the positive electrode active materials in Examples 1 and 2 according to the present disclosure, compared with the positive electrode active material in Comparative Example 1, in which an alkaline earth metal having oxidation number of +2, i.e., Sr was not doped and a phosphate coated layer was not included.

Furthermore, it was found that the amount of lithium by-products was significantly reduced in the positive electrode active materials in Examples 1 and 2 according to the present disclosure, even compared with the positive electrode active material in Comparative Example 2, in which Sr was doped but a phosphate coated layer was not included, and the positive electrode active material in Comparative Example 3, in which a phosphate coated layer was included but Sr was not doped. These results mean that the positive electrode active material according to the present disclosure may more effectively reduce lithium by-products by being doped with an alkaline earth metal having oxidation number of +2 and including a phosphate coated layer.

Therefore, the positive electrode active material according to the present disclosure has low content of lithium by-products (LiOH and $Li_2CO_3$) as basic impurities, and thus may minimize swelling resulting from gas generation caused by reactions with an electrolytic solution during the operation of a battery using the positive electrode active material and have structural stability, thereby being capable of improving life characteristics of the battery.

Experimental Example 2

Initial capacity characteristics of each cell manufactured in Examples 1-1 and 2-1 and Comparative Examples 1-1, 2-1, and 3-1, were comparatively analyzed.

The each cell was charged up to 4.24 V at 25 r under 0.1 C CC/CV condition, then discharged to 3.0 V under 0.1 C CC condition to measure charge capacity and discharge capacity, and charge/discharge efficiency and discharge rate characteristics were analyzed therethrough. Also, the ratio of discharge capacity at 2.0 C to discharge capacity at 0.1 C (discharge rate) was measured. The results are shown in Table 2 below.

TABLE 2

| Item | Example 1-1 | Example 2-1 | Comparative Example 1-1 | Comparative Example 2-1 | Comparative Example 3-1 |
|---|---|---|---|---|---|
| Charge capacity (mAh/g) | 216 | 215 | 214 | 217 | 215 |
| Discharge capacity (mAh/g) | 188 | 188 | 188 | 188 | 187 |
| Charge/Discharge Efficiency (%) | 87.2 | 87.3 | 87.2 | 86.7 | 87.0 |
| Discharge rate (%, 2.0 C/0.1 C) | 88.9 | 88.9 | 89.1 | 89.0 | 88.8 |

As shown in Table 2, it was found that the cells in Examples 1-1 and 2-1, which include the positive electrode active material according to the present disclosure, had excellent initial capacity characteristics of the same level without deterioration, compared with the secondary cells in Comparative Examples 1-1, 2-1, and 3-1, which include a typical lithium-nickel based composite oxide as a positive electrode active material.

Experimental Example 3

Life characteristics of each cell in Examples 1-1 and 2-1 and Comparative Examples 1-1, 2-1, and 3-1 were comparatively analyzed.

Each cell was repetitively charged and discharged over 100 cycles under 1.00 charge and 1.00 discharge condition, and capacity degradation according to the number of repetitions was measured. The results are shown in FIG. 1.

Figure 1:
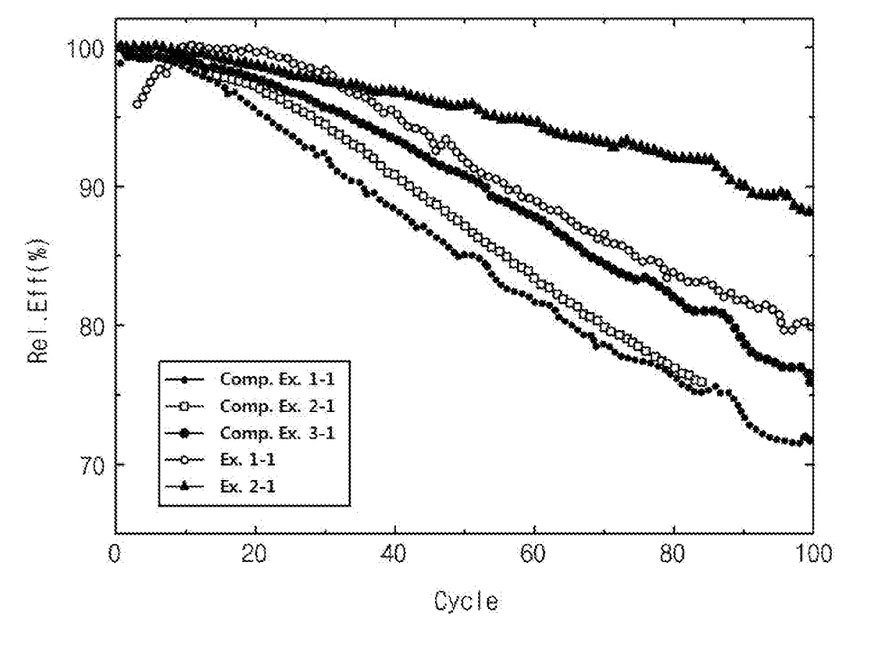
FIG. 1 is a graph showing comparative results of life characteristics of batteries according to embodiments of the present disclosure.

As shown in FIG. 1, it was found that the cells in Examples 1-1 and 2-1, in which an alkaline earth metal having oxidation number of +2, i.e., Sr was doped and a phosphate coated layer was included according to the present disclosure, had better retention ratio during 100 charge/discharge cycles, compared with the cells in Comparative Examples 1-1, 2-1, and 3-1.

Particularly, the cell in Example 1-1, after 55 charge/discharge cycles, showed higher capacity by about 10% or more, compared with the cells in Comparative Examples 1-1, 2-1, and 3-1, and after 100 charge/discharge cycles, showed higher capacity by about 20% or more, compared with the cells in Comparative Examples 1-1 and 2-1, and by about 15% or more, compared with the cells in Comparative Examples 3-1. That is, as the number of charge/discharge cycles increases, differences in cell capacity between the cells in Comparative Examples 1-1, 2-1, and 3-1 and the cells in Examples 1-1 and 2-1 become still greater. Therefore, it was confirmed that the cells in Examples 1-1 and 2-1 according to the present disclosure have remarkably higher capacity retention ratios, and thus have significantly better life characteristics.

These results mean that the positive electrode active material according to the present disclosure includes a lithium-nickel based transition metal composite oxide in which an alkaline earth metal having oxidation number of +2 is doped and a phosphate coated layer formed on the outer surface of the composite oxide, and thus the alkaline earth metal having oxidation number of +2 acts as a kind of pillar in crystal lattices of the composite oxide, thereby improving structural stability of the positive electrode active material and reducing a natural loss of lithium cations and thus reducing the formation of lithium by-products caused by the natural loss of lithium cations, and at the same time, the phosphate coated layer formed on the outer surface of the composite oxide reacts with lithium by-products present on the outer surface of the composite oxide to reduce the lithium by-products, thereby preventing swelling and resistive film formation caused by the by-products, in turn improving storage characteristics and life characteristics of the battery including the positive electrode active material.

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. A lithium secondary battery comprising:
a positive electrode in which a current collector is coated with a slurry comprising a positive electrode active material,
wherein the positive electrode active material comprises:
a lithium-nickel based transition metal composite oxide having a layered structure, which is expressed by Chemical Formula 1 below; and
a phosphate coating layer formed on the surface of the composite oxide, $$Li_xNi_aM_bA_wO_{2-y}D_y$$ [Chemical Formula 1]

where, $1.0 \leq x \leq 1.2$, $0.5 \leq a \leq 1$, $0 < b \leq 0.3$, $0 \leq y < 0.2$, $0 < w \leq 0.3$, and $2 \leq x+a+b+w \leq 2.2$, M is $Mn_{b1}Co_{b2}$, where, $0 < b1+b2 \leq 0.3$, A is Sr, and D is at least one selected from the group consisting of S, N, F, Cl, Br, I, and P, wherein the content of nickel in the positive electrode active material is 70 mol % or more based on the total amount of metallic components excluding lithium, wherein a phosphate precursor as a raw material of the phosphate is at least one selected from the group consisting of $(NH_4)_2HPO_4$, $(NH_4)_2H_2PO_4$, $(NH_4)_3PO_4 \cdot (3H_2O)$, $H_3PO_4$, and $P_2O_5$ and the phosphate coating layer has a thickness of 1 to 100 nm, wherein the phosphate coating layer comprises $Li_3PO_4$, wherein a total amount of $Li_2CO_3$ and LiOH on a surface of the positive electrode active material is 0.276 wt % or less, and wherein the lithium secondary battery has a capacity retention ratio of 90% or more compared to the initial capacity, after 55 cycles under 1.0C charge and 1.0C discharge condition at 45° C.

2. The lithium secondary battery of claim 1, wherein Sr is located at lithium sites or vacant sites in crystal lattices.

* * * * *